(12) United States Patent
Williams

(10) Patent No.: US 7,116,671 B2
(45) Date of Patent: Oct. 3, 2006

(54) METHOD AND APPARATUS FOR PROVIDING OC-N VIRTUAL BRIDGE PORTS

(75) Inventor: Matthew Robert Williams, Kanata (CA)

(73) Assignee: CIENA Corporation, Linthicum, MD (US)

( * ) Notice: Subject to any disclaimer, the term of this patent is extended or adjusted under 35 U.S.C. 154(b) by 1105 days.

(21) Appl. No.: 09/728,988

(22) Filed: Dec. 4, 2000

(65) Prior Publication Data

US 2004/0101303 A1    May 27, 2004

(51) Int. Cl.
*H04L 12/28* (2006.01)
*H04J 3/02* (2006.01)

(52) U.S. Cl. ............... 370/395.21; 370/408; 370/541; 709/240

(58) Field of Classification Search ............. 370/395.2, 370/395.21, 395.3, 395.4, 408, 539, 541, 370/543
See application file for complete search history.

(56) References Cited

U.S. PATENT DOCUMENTS

| | | | | |
|---|---|---|---|---|
| 5,920,705 | A * | 7/1999 | Lyon et al. | 709/240 |
| 6,236,660 | B1 | 5/2001 | Heuer | |
| 6,256,292 | B1 * | 7/2001 | Ellis et al. | 370/227 |
| 6,587,470 | B1 * | 7/2003 | Elliot et al. | 370/404 |
| 6,965,619 | B1 * | 11/2005 | Bisson et al. | 370/543 |

FOREIGN PATENT DOCUMENTS

| | | |
|---|---|---|
| EP | 0 982 959 A2 | 8/1998 |
| EP | 0 982 959 A3 | 8/1998 |
| EP | 0 982 901 A2 | 12/1998 |
| EP | 0 982 901 A3 | 12/1998 |
| EP | 0 982 900 A2 | 6/1999 |
| EP | 0 982 900 A3 | 6/1999 |

OTHER PUBLICATIONS

"Transparent Mappings into SONET Paths for Block-Coded Data Formats"; Contribution to T1 Standard Project, Jul. 10, 2000, XP-002177439; whole document.
"A Hybrid Data Transport Protocol for SONET/SDH and Direct Data Overoptical Networks", proceedings from the IEEE Conference on High Performance Switching and Routing, 2000, pp. 13-23, XP001016435, whole document.
Information Technology—Fibre Channel—Physical and Signaling Interface (FC-PH), Rev.4.3, ANSI Xf3.230-199x, Jun. 1, 1994, 396 pages.
Information Technology—Fibre Channel—Physical and Signaling Interface—2 (FC-PH-2), Rev. 7.4, ANSI X3.297, Sep. 10, 1996, 183 pages.

* cited by examiner

*Primary Examiner*—Afsar Qureshi
(74) *Attorney, Agent, or Firm*—Dougherty Clements; Christopher L. Bernard; Tyler S. Brown

(57) ABSTRACT

A method and apparatus for intelligent packet forwarding utilizing virtual ports defined by a grouping of one or more STS-1s allocated to source and destination I/O devices (client) connected to an NxSTS-1 SONET network. A data flow path for transporting the client data is established from one virtual port at the source port to another virtual port at the destination port. The data flow path is established by notifying each of the ports of the data flow path and providing to the source port an address identifying the destination port and providing to the destination port an address identifying the source port.

7 Claims, 3 Drawing Sheets

(a)

| Router Name | MAC Address | IP Address |
|---|---|---|
| R1 | M1 | IP1 |
| R2 | M2 | IP2 |
| R3 | M3 | IP3 |

Router 1's Route and ARP table

| Destination Router | IP Address (Layer 3) | MAC Address (Layer 2) |
|---|---|---|
| R2 | IP2 | M2 |
| R3 | IP3 | M3 |

(b)

NAD 1's forwarding rule table (static)

| Destination MAC | Forwarding Decision |
|---|---|
| Broadcast | All sub-flows |
| M2 | STS-1 subflow to 2 |
| M3 | STS-1 subflow to 3 |
| Unknown | Drop frame |

METHOD AND APPARATUS FOR PROVIDING OC-N VIRTUAL BRIDGE PORTS

FIELD OF THE INVENTION

This invention relates to a method and apparatus for subdividing the physical ports of network access devices into virtual ports.

BACKGROUND OF THE INVENTION

A bridged ethernet network sometimes requires that a physical port be subdivided into virtual ports to allow peering with more bridging elements than the number of physical ports allows. Currently, ATM VPs/VCs and Frame Relay paths are used in the communications industry to establish such virtual ports. However, for very high bandwidths these technologies are not suitable due to both technical reasons and their high cost. On the other hand SONET/SDH devices can easily scale to very high bandwidths and are widespread in metropolitan and wide area networks (MAN/WAN).

There is a need, therefore, for means to economically and effectively bridge network access devices transporting optical line data, such as from a fiber channel (FC) or Gigabit Ethernet (GbE) interface, to a SONET metropolitan area network (MAN)/wide area network (WAN).

SUMMARY OF THE INVENTION

In accordance with the present invention there is provided a method and apparatus for intelligent packet forwarding utilizing virtual ports defined by a grouping of one or more STS-1s allocated to source and destination I/O devices (client) connected to an N x STS-1 SONET network. A data flow path for transporting the client data is established from one virtual port at the source port to another virtual port at the destination port. The data flow path is established by notifying each of the ports of the data flow path and providing to the source port an address identifying the destination port and providing to the destination port an address identifying the source port.

BRIEF DESCRIPTION OF THE DRAWINGS

The invention will now be described in detail with reference to the following drawings in which like reference numerals refer to like elements throughout.

DETAILED DESCRIPTION OF THE ILLUSTRATED PREFERRED EMBODIMENT

Figure 1:
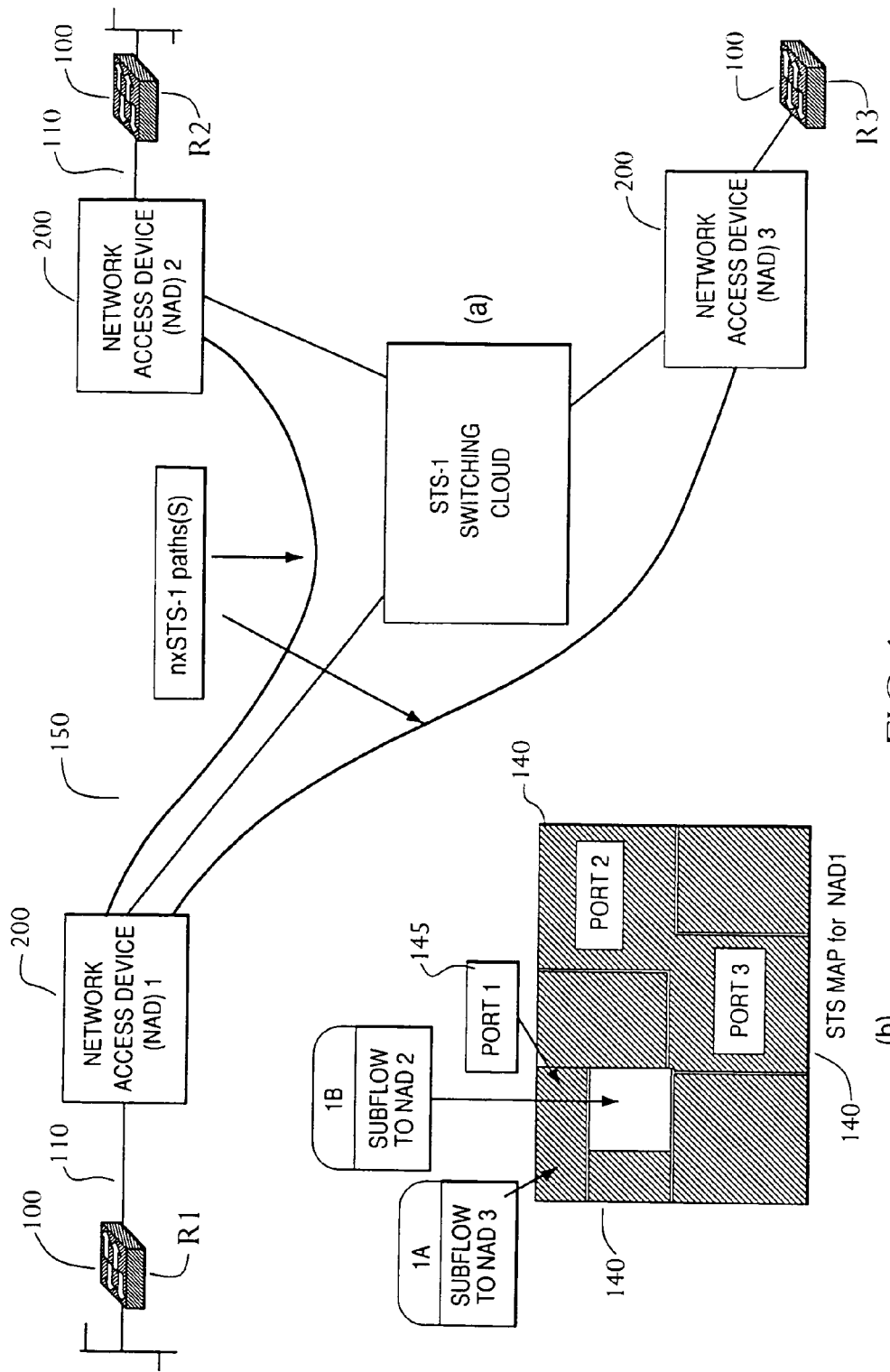
FIG. 1(a) is a schematic block diagram of a metro/wide area data transport network illustrating, by the virtual paths S, the functionality of the method and apparatus of the present invention which is comprised within network access devices (NADs)
FIG. 1(b) is a schematic illustration of the virtual ports provided by a physical port 1 of the network access device NAD1.

FIG. 1 of the drawings is a schematic block diagram illustrating an exemplary data transport network 150 for transporting optical serial data output from one I/O device 100 for transport through the network 150 to another I/O device 100. Through a high speed optical point-to-point link 110 a network access device (NAD) 200 interfaces each I/O device 100 to the network 150 and multiplexes the optical serial frame data signal into an optical SONET frame signal in a manner which controls the flow of the data and flexibly allocates STS-1s (i.e. bandwidth) to each of the input I/O devices 100 interfaced to the NAD. At the receive end of the data transport another NAD 200 receives the transported SONET format data from the metro/wide area link 150 and demultiplexes and outputs the data onto another high speed optical point-to-point link 110 for transport to the other I/O device 100. The optical serial links 110, 110a could be ethernet (e.g. 10 Mbps, 100 Mbps or 10 Gbps) or Fiber Channel (FC) and the metro/wide area fiber link 120 could be any of a dedicated fiber, dark fiber or WDM (Wavelength Division Multiplexed) fiber to provide a clear channel.

Figure 2:
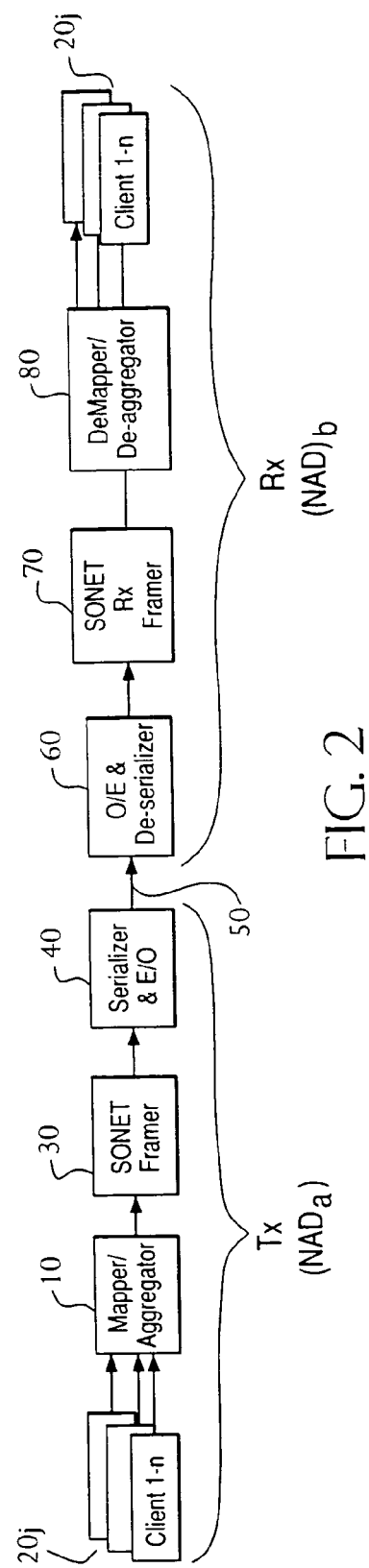
FIG. 2 is a functional block diagram of an end-to-end link of a the data transport network of FIG. 1 showing the components of the transmit side of a network access device, for transporting data from a transmit (Tx) node of the network, and the components of the receive side of another network access device, for receiving data at a receive (Rx) node of the network; and, FIGS. 3(a), (b) and (c) are tables which illustrate a set of MAC/IP addresses identifying I/O devices (a), a set of addresses for the particular destination I/O devices of the example (b) and a set of exemplary rules (for which the MAC address is chosen for use rather than the IP address) for the forwarding of data output by network access device NAD1 shown in FIG. 1(c), all for the particular circumstances of the example chosen in which NAD1 is sending data from an ethernet link.

FIG. 2 is a functional block diagram of an end-to-end link of the data transport network 150 showing the functional blocks thereof for transporting data from a transmit (Tx) node to a receive (Rx) node of the network including the mapper/aggregator 10 and demapper/deaggregator 80 which provide the multiplexer/demultiplexer functions of the NAD 200. In this figure the network components of the transmit (Tx) and receive (Rx) nodes provided by two NADs, servicing clients (i.e. I/O devices) $20_{i,j}$, are shown.

The multiplexer/demultiplexer components of the NAD 200 are described in greater detail in an application filed herewith and owned by same assignee as this application, which is incorporated herein by reference. At the transmit node the mapper/aggregator 10 performs two related functions which combine to perform flexible time-division multiplexing (based on the SONET standard) to transport the data. First, a mapper maps the client data into a SONET payload whereby STS-1's are allocated to a particular client $20_i$ based on a bandwidth allocation configuration provided to it. Since each STS-1 represents a fixed amount of bandwidth the number of STS-1's assigned to a client determines how much bandwidth is allocated to that client. Advantageously, the assignment of bandwidth to each client is flexible in that it can be assigned and changed based on any number of determinants (control parameters) set by a user, a network operator, an application and/or network conditions such as traffic, time of day, etc. Second, an aggregator aggretates (i.e. combines) the client STS-1's into a composite STS payload (e.g. STS-48 or STS-192). The aggregate data stream is then fed into a standard SONET transmit framer 30 to insert section/line/path overhead information (data) and create a proper SONET frame. The parallel output from the framer 30 is then serialized and converted to an optical signal by a serializer/E-O converter 40 for transmission over an optical channel 50 of the metro/wide area link 150.

At the receive node the received optical signal is converted back to an electrical signal and to parallel format by an O-E/deserializer converter 60 and then fed into a SONET receive framer 70 where the section/line/path overhead data is extracted and processed. The resulting data stream is passed into a de-aggregator/de-mapper 80 which performs the inverse function of the mapper/aggregator 10. The deaggregator receives the composite STS-48 payload from the SONET framer and, based upon an assigned local bandwidth allocation configuration input thereto, it then separates the composite STS stream into STS-1's according to the client $20_j$ they are assigned to. The demapper then takes the STS-1's assigned to a particular client $20_j$ and extracts the client data from them.

The mapper/aggregator 10 and de-aggregator/de-mapper 80 each use a configuration memory to assign/map each STS-1 to a particular client. For any particular assignment of bandwidth (STS-1s) a client can be assigned any number (n) of STS-1s from n=0 to n=N, where N is the total number of STS-1s of the channel (e.g. 48 if an OC-48 channel is used). Network management software (a network controller) may provides the transmit (Tx) and receive (Rx) nodes with the bandwidth allocation map which assigns STS-1's to the particular clients $20_i$, $20_j$.

In accordance with the present invention fields from layer 2 or layer 3 (or any layer above layer 1) are used to direct data traffic between virtual ports created on the basis of groupings of STS-1s of the physical ports of the NAD. As illustrated by FIG. 1(*b*) the physical ports of an NAD 200 are subdivided into virtual ports made up of the groups of STS-1s allocated to a particular client. Each group of STS-1s are treated as a separate (distinct) traffic stream and are independently routed over the network 150 to their own destination. In the example shown by FIG. 1(*b*) the network access device NAD1 has three physical ports 140 and the first port 145 comprises two virtual ports 1A and 1B each comprising the number of STS-1s which are allocated to the particular I/O devices whose data is carried by those STS-1 groups. Knowledge of the layer addressing (e.g. for layer 2 in an ethernet link this would be MAC addressing) at each end of the flow path (S) for a given STS-1 group is used to define a bridge between those end points (referred to herein as a "virtual bridge"). Advantageously, this functionality collectively provides flexible bridging over the entire network.

The tables of FIG. 3 illustrate a set of exemplary rules applied within the network for the forwarding of data output by a first physical port 145 of the network access device NAD1 to each of network access devices NAD2 and NAD3. For this example ethernet data is assumed and the field used for the addressing of the ends of S-paths is the layer 2 MAC address (although the IP address could alternatively be used). A virtual port 1A is defined by a group of client allocated STS-1s whose destination is an I/O device 100 fed by NAD2 and another virtual port 1B is defined by a different group of client allocated STS-1s whose destination is another I/O device 100 fed by NAD3. In the example shown in FIGS. 1 and 3 the destination I/O device interfaced to NAD2 is a router R2 and the destination I/O device interfaced to NAD3 is another router R3. For illustration purposes in FIG. 3 the MAC address (layer 2) for R2 is designated M2 and the MAC address for R3 is designated M3. (The IP address for R2 designated as IP2 and the IP address for R3 designated as IP3 are also illustrated to indicate that layer 3 addresses can instead be used.)

For this example a given set of rules is applied within the network in order to transport the data defined by virtual port 1A to R2 and the data defined by virtual port 1B to R3 and these are shown by the table (c) of FIG. 3. As illustrated the MAC address assigned to the destination I/O device is used to direct the flow of each virtual port.

For purposes of illustrating the routing method of the invention, using an example, the following selected definitions are used:

(a) The group of STS-1s that are treated as a single pipe and routed through the core network together are referred to as an s-path.
(b) The MAC addresses of three I/O devices (I/O1, I/O2 and I/O3) on the network are referenced MA1, MA2 and MA3.
(c) The three I/O devices are on three different NADs. I/O1 is on NAD1, I/O2 is on NAD2 and I/O3 is on NAD3.
(d) There are three different s-path groups to be routed and each s-path represents a traffic flow between two I/O devices. S1-2 represents and carries the traffic flow between the I/O1 and I/O2. S1-3 represents and carries the traffic flow between I/O1 and I/O3. S2-3 represents and carries the traffic flow between I/O2 and I/O3.

For a user to establish a connection through the network between I/O1 and I/O2, the s-path S1-2 must be created. At this point, both NAD1 and NAD2 must be made aware of S1-2 and also the MAC addresses at the ends of the s-path. This s-path to MAC addressment assignment may be established by the network management system (NMS) as follows:

1. The NMS is informed by the user that I/O1 (through it's MAC address MA1) is attached to NAD1 and that I/O2 is attached through NAD2.
2. When the s-path S1-2 between I/O1 and I/O2 is created, the NMS informs NAD1 that MA2 is at the end of S1-2 and the NMS informs NAD2 that MA1 is at the end of S1-2.

Alternatively, instead of using the NMS to establish the MAC to s-path assignment, a user can do so directly as follows:

1. The user informs NAD1 directly that a new s-path S1-2 exists in the network.
2. The user informs NAD1 that MA2 is at the end of S1-2.
3. The user informs NAD2 directly that a new s-path S1-2 exists in the network.
4. The user informs NAD2 that MA1 is at the end of S1-2.

It is to be noted that multiple I/O devices may be connected to a single NAD. In all of the above s-path and MAC address assignments, the I/O device and it's MAC address are associated with a port on the NAD and not the entire NAD.

Various means may be used by the NMS/user to inform the I/O devices and NADs associated therewith of the created S-paths and MAC addresses at the ends thereof. This information can be provided either in-band (i.e. within the SONET payload/overhead) or out-of-band (i.e. carried to the NADs via an external network).

The network 150 provides an appearance of a distributed L2 switch. As there is a potential for only a partial mesh of STS-1 flows only certain I/O device ports will be connectable (e.g. if an STS-1 flow does not exist between a first and second I/O device port those ports cannot be connected). In such case the data traffic going from a first I/O device port to a second I/O device port must be routed via another I/O port which does have an STS-1 flow to the second I/O device port and calculation of such extended route is accomplished automatically by supported routing protocols. Also, as the MAC address to NAD port assignment is done manually, this method is inherently secure, making it difficult for third-parties to "break into" or "spoof" a private network created through a group of s-paths.

Advantageously, the foregoing method of assigning a group of STS-1s to a given flow of ethernet frames guarantees that QoS automatically results. As such the IT network is able to implement a form of traffic guarantee with non-QoS-aware ethernet/IP switches such that a core is implemented with no contention for bandwidth.

The individual electronic and processing functions utilised in the foregoing described preferred embodiment are, individually, well understood by those skilled in the art. It is to be understood by the reader that a variety of other implementations may be devised by skilled persons for substitution. Persons skilled in the field of communication design will be readily able to apply the present invention to an appropriate implementation method for a given application.

Consequently, it is to be understood that the particular embodiment shown and described herein by way of illustration is not intended to limit the scope of the invention claimed by the inventors which is defined by the appended claims.

What is claimed is:

1. A method for intelligent packet forwarding over a network, comprising:
   providing a virtual ports comprising a grouping of one or more STS-1s is allocated to a source client and a destination client and an amount of bandwidth associated with the grouping;
   assigning the grouping to a data flow path from a source port of the source client to a destination port of the destination client, wherein the assigning of the grouping is done through one of a network management system connected to the source client and the destination client and directly through the source client and the destination client;
   establishing the data flow path for the grouping from the source port to the destination port, wherein the data flow path is established from a first virtual port at the source port to a second virtual port at the destination port; and
   wherein the routing in the network of the grouping of one or more STS-1s is independent of the virtual ports.

2. A method according to claim 1, further comprising notifying each of said source port and destination port of said data flow path, and providing to said source port an address identifying said destination port and providing to said destination port an address identifying said source port.

3. The method according to claim 1 wherein the network is a SONET network.

4. The method according to claim 1, wherein the grouping of one or more STS-1s is connected to a network access device.

5. An apparatus for intelligent packet forwarding over a network, comprising:
   a grouping device that provides virtual ports comprising a grouping of one or more STS-1s allocated to a source client and a destination client and an amount of bandwidth associated with the grouping;
   an assignment device that assigns the grouping to a data flow path from a source port of the source client to a destination port of the destination client, wherein the assignment device assigns the grouping through one of a network management system connected to the source client and the destination client and directly through the source client and the destination client;
   forwarding rules for transporting data on a data flow path extending from said source port to said destination port and notifying each of said ports of said data flow path, wherein the data flow path is established from a first virtual port at the source port to a second virtual port at the destination port; and
   wherein the routing in the network of the grouping of one or more STS-1s is independent of the virtual ports.

6. The apparatus according to claim 5, further comprising an address identifier for identifying and providing to said source port an address identifying said destination port and for identifying and providing to said destination port an address identifying said source port.

7. The apparatus according to claim 5, wherein the network is a SONET network.

* * * * *